(12) United States Patent
Alameh et al.

(10) Patent No.: US 7,600,925 B2
(45) Date of Patent: Oct. 13, 2009

(54) CLIP CONNECTOR FOR USE IN AN OPTICAL COMMUNICATION COUPLING SYSTEM

(75) Inventors: Rachid M. Alameh, Crystal Lake, IL (US); Mark A. Barabolak, Elmhurst, IL (US); Maninder S. Sehmbey, Hoffman Estates, IL (US); David R. Zeiger, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/616,470

(22) Filed: Dec. 27, 2006

(65) Prior Publication Data

US 2008/0159698 A1 Jul. 3, 2008

(51) Int. Cl.
*G02B 6/36* (2006.01)
*G02B 6/46* (2006.01)

(52) U.S. Cl. .......................... 385/89; 385/137

(58) Field of Classification Search .................. None
See application file for complete search history.

(56) References Cited

U.S. PATENT DOCUMENTS 4,549,782 A * 10/1985 Miller .......................... 385/48
6,273,990 B1 * 8/2001 Bookbinder et al. ........ 156/344
6,845,148 B1 1/2005 Yoshimura et al.
2005/0111781 A1 5/2005 Jain et al.
2005/0201707 A1 9/2005 Glebov et al.
2005/0224946 A1 10/2005 Dutta
2005/0232553 A1 10/2005 Holmquist
2007/0189031 A1 * 8/2007 Delmar ....................... 362/556

FOREIGN PATENT DOCUMENTS

| DE | 4228996 C1 * | 7/1993 |
| GB | 2028534 A | 9/1979 |
| GB | 2143651 A | 2/1985 |
| WO | 8502271 A1 | 5/1985 |

* cited by examiner

*Primary Examiner*—Omar Rojas
(74) *Attorney, Agent, or Firm*—Lawrence J. Chapa

(57) ABSTRACT

An optical communication coupling system (206) for use in a device is provided. The optical communication coupling system (206) includes an optical fiber (208) and a clip connector (302). The optical fiber (208) is capable of conveying light between a first optical communication element (202) and a second optical communication element (204). The clip connector (302) is capable of receiving the optical fiber (208) and altering it to create an access point, which allows for a transfer of light between the optical fiber (208) and one of the first optical communication element (202) and the second optical communication element (204).

16 Claims, 3 Drawing Sheets

CLIP CONNECTOR FOR USE IN AN OPTICAL COMMUNICATION COUPLING SYSTEM

FIELD OF THE INVENTION

The present invention relates generally to a clip connector for use in an optical communication coupling system, and more specifically, to a clip connector for creating an access point in an optical fiber, when the optical fiber is received by the clip connector.

BACKGROUND OF THE INVENTION

There has been an increased use of and greater complexity of active elements in a communication device, which need to be physically linked and/or communicatively coupled to other elements of the communication device. Examples of such a communication device include, but are not limited to, a radio telephone, a music playback device (i.e. MP3 player), a pager, a laptop computer, a desktop computer and a Personal Digital Assistant (PDA). Examples of the active elements include, but are not limited to, a camera, a display, and a fingerprint sensor. In at least one common configuration, the communication device can include one or more housings, where a greater number of the active elements are increasingly being placed on the one or more housings of the communication device. This has tended to result in an increasing amount of data such as video content and audio content to be transmitted either in each of the one or more housings and/or between multiple housings of the communication device. The increased data can be accommodated either by increasing the number of data lines and/or an increase in the data rate on at least some of the data lines.

In one of the known methods for transmitting data, the data is typically routed via a multi-layer electric flex circuit. The multi-layer electric flex circuit generally includes multiple layers of high density conductive traces interleaved with an insulating material. The multi-layer electric flex circuit is then passed through a restricted space between the one or more housings. However, routing a large number of signals through the restricted space can result in the multi-layer electric flex circuit that is less reliable mechanically and has greater radio-frequency interference. In a yet another known method for physically linking and/or communicatively coupling active elements to other corresponding elements, the use of an optical fiber is required. This method also requires the use of ferrules and plugs to interconnect the active elements with the other corresponding elements. However, the method requires that an optical fiber is always perpendicular to the active elements. Further in this method, plural segments of the optical fiber are required to couple the various pairs of active elements and/or corresponding elements. The use of multiple (i.e. plural) segments of the optical fiber can make the process of coupling of various pairs of elements more complex.

In light of the above-mentioned discussion there is a need for a system for inter and/or intra data transmission in the one or more housings of the communication device which limits the amount of the radio-frequency interference. The system should enable coupling of each pair of the active elements and/or the corresponding elements by using a reduced number of communicative elements. Further the system should be cost-effective and easy to assemble.

SUMMARY OF THE INVENTION

The present invention provides an optical communication coupling system for use in a device. In the present invention, a signal in the form of light is used for data transmission between a first optical communication element and a second optical communication element in the device. In at least one embodiment of the present invention, the optical communication coupling system includes an optical fiber and a clip connector. The optical fiber is capable of conveying light between the first optical communication element and the second optical communication element. The clip connector is capable of receiving the optical fiber. The clip connector is also capable of altering the optical fiber to create an access point, which enables transfer of the light between the optical fiber and at least one of the first optical communication element and the second optical communication element.

In a further embodiment of the present invention, a device is provided, that can include a first optical communication element and a second optical communication element. The device can also include an optical communication coupling system. Further, the optical communication coupling system includes an optical fiber and a clip connector. The optical fiber is capable of conveying light between the first optical communication element and the second optical communication element. The clip connector is capable of receiving the optical fiber. The clip connector is also capable of altering the optical fiber to create an access point, which enables transfer of light between the optical fiber and at least one of the first optical communication element and the second optical communication element.

In a yet further embodiment of the present invention, a clip connector that enables optical communication between an optical fiber and an optical communication element is provided. The clip connector has an abrasive surface. The abrasive surface is capable of abrading a first surface of the optical fiber when the optical fiber is inserted into the clip connector. The clip connector also includes an aperture that is capable of conveying light through the first surface from/to the optical communication element to/from the optical fiber. The resulting abrasion occurs when the optical fiber is inserted into the clip connector. When the optical fiber is completely inserted into the clip connector, the resulting abrasion of the optical fiber is aligned with the aperture and with at least one of a light emitting and a light receiving optical communication element.

These and other features, as well as the advantages of this invention, are evident from the following description of one or more embodiments of this invention, with reference to the accompanying figures.

BRIEF DESCRIPTION OF FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
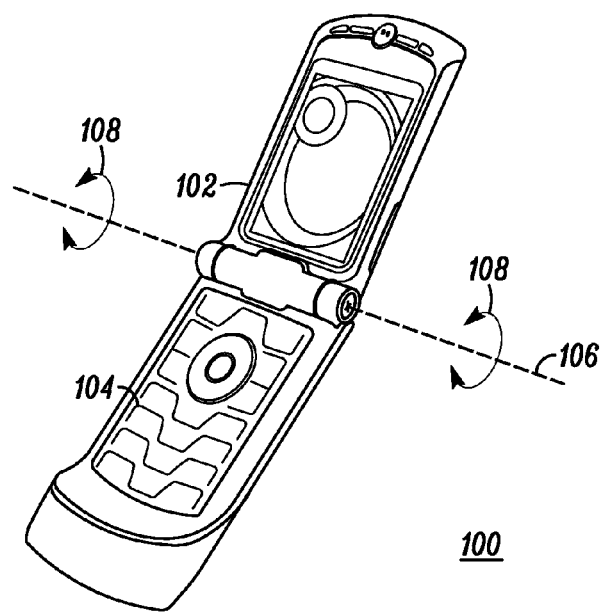
FIG. 1 illustrates an exemplary device, where various embodiments of the present invention can be applicable.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of various embodiments of the present invention.

DETAILED DESCRIPTION

Before describing in detail the particular system for communication, in accordance with the present invention, it should be observed that the present invention resides primarily as apparatus components related to an optical communication coupling system. Accordingly, the apparatus components have been represented where appropriate by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' or any other variation thereof are intended to cover a non-exclusive inclusion, such that an article or apparatus that comprises a list of elements does not include only those elements, but may include other elements that are not expressly listed or inherent in such an article or apparatus. An element proceeded by 'comprises . . . a' does not, without more constraints, preclude the existence of additional identical elements in the article or apparatus that comprises the element. The term 'another,' as used in this document, is defined as at least a second or more. The terms 'includes' and/or 'having', as used herein, are defined as comprising.

FIG. 1 illustrates an exemplary device 100, where various embodiments of the present invention can be applicable. Examples of the device 100 include, but are not limited to, a wireless communication device, a radio telephone, a pager, a laptop computer, a music playback device i.e. MP3 player, and a Personal Digital Assistant (PDA). The particular device illustrated has a two part housing which is adapted to move relative to one another. While the particular exemplary device illustrated includes a two part housing, one skilled in the art will readily appreciate that the present invention can be implemented in other types of devices having multiple housings, as well as devices of the type having a single housing. As illustrated the device 100 includes a first housing 102 and a second housing 104. In other words, it will be apparent to a person ordinarily skilled in the art that though the device 100 is shown to include the first housing 102 and the second housing 104, the present invention is applicable for the same and other types of devices with greater, the same, or fewer number of housings. In the illustrated embodiment, the first housing 102 and the second housing 104 can move relative to each another along an axis 106. Doubly pointed arrow 108 in FIG. 1 illustrates a potential movement of the first housing 102 and the second housing 104 relative to each another, which results in a closed position and an open position, as well as any number of positions in between.

In at least some embodiments of the present invention, the first housing 102 and the second housing 104 of the device 100 can include one or more active elements that need to be communicatively coupled to one or more corresponding elements present on either the same housing and/or the other one of the first housing 102 and the second housing 104. Examples of active elements include, but are not limited to, a camera, a display and a fingerprint sensor. For example, a camera present on the first housing 102 may need to be communicatively coupled to a microprocessor present on the second housing 104. Similarly, a fingerprint sensor present on the second housing 104 may need to be communicatively coupled to another microprocessor present on the second housing 104.

Figure 2:
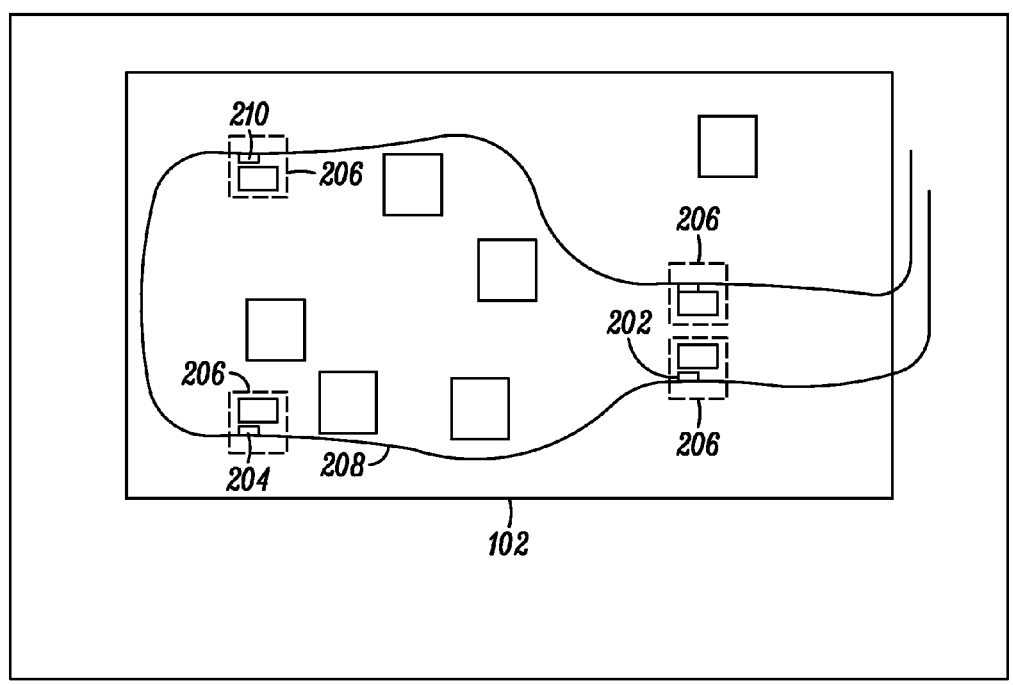
FIG. 2 illustrates a housing of a device incorporating a plurality of optical communication elements and an optical communication coupling system for facilitating a communication coupling between the optical communication element, where various embodiments of the present invention can be applicable.

FIG. 2 illustrates the first housing 102 of the device 100, where various embodiments of the present invention are applicable. As illustrated, the device 100 includes a first optical communication element 202 on the first housing 102. The first housing 102 also includes a second optical communication element 204. The first optical communication element 202, the second optical communication element 204, together with other optical communication elements form a plurality of communication elements 206, between which an optical communication coupling system can convey one or more optical signals. The optical communication coupling system includes an optical fiber 208. The optical fiber 208 is capable of conveying light between at least some of the plurality of optical communication elements including the first optical communication element 202 and the second optical communication element 204. While in the embodiment illustrated the optical fiber is used to couple optical communication elements associated with a common housing, it will be apparent to a person ordinarily skilled in the art, that the optical communication elements being coupled together by the optical fiber 208 can be present on one or more different housings of the device 100. In at least one embodiment of the present invention, when the first optical communication element 202 is present on the first housing, and when the second optical communication element 204 is present on the second housing 104, the optical fiber 208 can be passed through the hinge space between the first housing 102 and the second housing 104.

The optical communication coupling system 206 also includes a clip connector which will be explained in detail in conjunction with FIGS. 3-5. The clip connector enables optical communication between the optical fiber 208 and at least one of the first optical communication element 202 and the second optical communication element 204. In some instances the optical fiber 208 can be coupled to an optical communication element at one of the two endpoints. In other instances, the optical fiber can be coupled to an optical communication element at a point along the length of the optical fiber between the two endpoints. Generally, at least a pair of optical communication elements will be associated with a particular length of fiber, where one of the optical communication elements will function as a transmitter and be a source of the optical signal being carried or conveyed by the optical fiber, and one or more of the optical elements will function as a receiver and be the intended destination(s) of the optical signal. Further, it will be apparent to a person ordinarily skilled in the art that other optical communication elements for example, an optical communication element 210, can also operate as a source of an optical signal to be carried or conveyed in the optical fiber 208, along with the first optical communication element 202. In some instances, multiple optical communication elements operating as transmitters can share an optical fiber 208 by implementing some form of multiplexing, such as time-division multiplexing, in which each transmitter has an assigned time slot during which the optical communication element can transmit.

In at least one embodiment of the present invention, wavelength-division multiplexing can additionally and/or alternatively be used and potentially allow for multiple sources of an optical signal to operate simultaneously. In wavelength-division multiplexing, multiple data carrying signals are multiplexed on a single optical-fiber by using different wavelengths of light. The multiple wavelengths of light each carry a different data signal. At the receiving end, the second optical communication element 204 can de-multiplex the associated signal intended for the optical communication element from the combined light signals being conveyed by the optical fiber 208. In at least some instances a color filter can be used to effectively isolate and/or demultiplex the intended signal.

The one or more optical communication elements operating as a transmitter produce a light with one or more characteristics which can be varied so as to encode and/or superimpose a stream of data on the light produced. Examples of the characteristics of the light which can be varied for the purpose of encoding and correspondingly decoding the data can include frequency, wave-length and phase. Examples of the one or more optical communication elements, which can be used to produce an optical signal, can include a light-emitting diode, a vertical-cavity surface emitting laser, an edge-emitting diode, a PIN (p-type, intrinsic, n-type diode) diode and a photo-diode. Examples of the optical fiber 208 can include an acrylic fiber, a plastic optical fiber and a glass optical fiber.

In at least one embodiment of the present invention, the optical fiber 208 is provided with a cladding. The cladding has one or more layers of material that is in contact with a core of the optical fiber 208. The material of the cladding typically has a refractive index that is less than a refractive index of the core of the optical fiber 208. The lower refractive index of the cladding largely results in the total internal reflection of the light in the optical fiber 208. In total internal reflection, the light is largely reflected inside the optical fiber 208 when the light attempts to transition between the optical core and the cladding. In another embodiment of the present invention the optical fiber 208 can be covered with paint and/or a reflective material. Examples of the reflective material can include, but are not limited to, silver, gold and copper. In a further embodiment of the present invention, the light can be totally reflected internally without the use of the cladding, the paint and/or the reflective material. In this embodiment, the light emitted by the first optical communication element 202 can be trapped and reflected inside the optical fiber 208 when the angle of the incidence of the light is below a critical angle of the optical fiber 208. The critical angle is the minimum angle of incidence at which the total internal reflection occurs.

The optical fiber 208 is generally capable of conveying at least a portion of the light introduced by the first optical communication element operating as a transmitter between the first optical communication element 202 and the second optical communication element 204. The second optical communication element 204 is capable of receiving and/or detecting the light including the changing characteristic of the light emitted by the first optical communication element 202.

Figure 3:
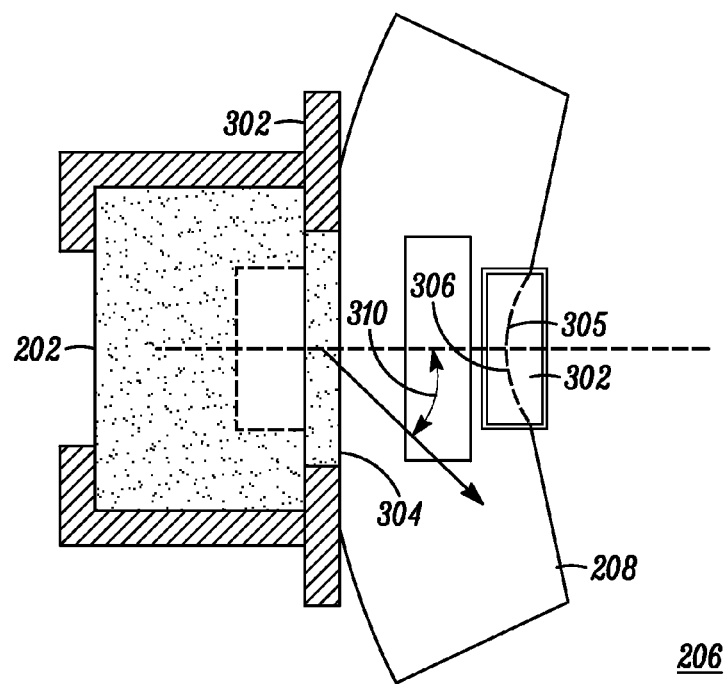
FIG. 3 illustrates a cross-sectional view of a clip connector for use in an optical communication coupling system for facilitating a conveyance of an optical communication signal between an optical fiber and an optical communication element at a point between the end points of the optical fiber, in accordance with at least one embodiment of the present invention.

FIG. 3 illustrates a cross-sectional view of a clip connector for use in the optical communication coupling system 206, in accordance with at least one embodiment of the present invention. The optical communication coupling system 206 also includes a clip connector 302. The clip connector 302 is adapted for receiving the optical fiber 208. When the clip connector 302 receives the optical fiber, the clip connector is further adapted to alter the optical fiber 208 to create an access point, which allows the transfer of light between the optical fiber 208 and at least one of the first optical communication element 202 and the second optical communication element 204. The clip connector 302 has an abrasive surface 304. The abrasive surface 304 is capable of abrading a first surface of the received optical fiber 208. An exemplary abraded surface 402 is illustrated in FIG. 4. The abrasion of the optical fiber 208, when the optical fiber 208 is inserted in the clip connector 302, creates an access point for light to enter or exit the optical fiber 208. The abrasive surface 304 can abrade the first surface by scratching the cladding, the paint and/or the reflective material when the optical fiber 208 is inserted into the clip connector 302. After insertion, the first surface of the optical fiber is in communicative contact with an optical communication element between which an optical signal can be exchanged. In the embodiment of the present invention, when the reflective material and/or the paint are used, the reflective material and/or the paint can be deposited in segments on the optical fiber 208. The segments of reflective material and/or paint are positioned along the length of the optical fiber 208, where the optical fiber 208 is most likely to be inserted into the clip connector 302. In at least one embodiment of the present invention, the clip connector 302 includes an aperture. When the optical fiber is inserted in the clip connector, the abraded surface is intended to be aligned with the aperture 404, which is illustrated in FIG. 4. The aperture is capable of conveying the light through the first surface of the optical fiber from either the first optical communication element 202 to the optical fiber 208 or from the optical fiber 208 to the second optical communication element 204, depending upon which one of the optical communication elements the clip connector is associated with.

In at least one embodiment of the present invention, a second surface that is opposite to the first surface can be intruded and/or deflected inward. The second surface can be intruded by introducing a kink 306 in the optical fiber at the second surface. The kink 306 can be provided via an intruding surface 305 or a protrusion on the portion of the clip connector 302, which comes into contact with the second surface of the optical fiber 208. The angle of the intruded surface is varied so as to deflect the light between a direction that would allow the light to escape from the optical fiber and a direction that enables the light to travel along the length of the optical fiber, when the light located in the optical fiber intersects the intruded surface.

In another embodiment of the present invention, the second surface of the optical fiber 208 is provided with a notch-cut, through which a portion of the clip connector can enter the fiber and interact with the light traveling therein. In at least some instances, the surface of the clip connector 302 in contact with and/or present within the notch-cut has a reflective surface. The reflective surface can deflect some of the light, which intersects the notch-cut between a direction that would allow the light to escape from the optical fiber and a direction that enables the light to travel along the length of the optical fiber 208. In accordance with another embodiment of the present invention, the first optical communication element 202 can emit the light at an angle 310 inside the optical fiber 208 instead of emitting the light perpendicular to the first surface of the optical fiber 208.

Figure 4:
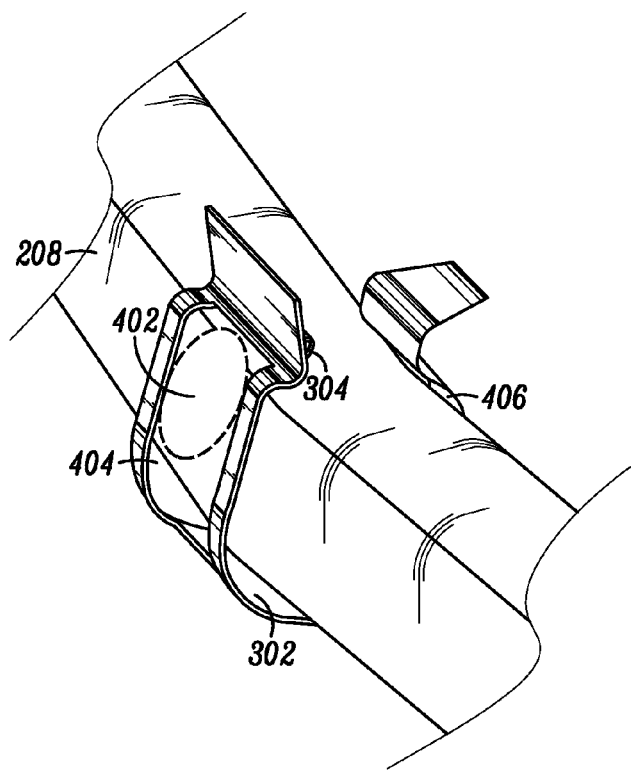
FIG. 4 illustrates a perspective view of a clip connector and a portion of an optical fiber being coupled thereto of an optical communication coupling system, in accordance with at least one embodiment of the present invention.

FIG. 4 illustrates the clip connector 302 of the optical communication coupling system 206 for use in conjunction with the device 100, in accordance with at least one embodiment of the present invention. In at least one embodiment of the present invention, the clip connector 302 is placed on a substrate, such as a printed circuit board, which can be present in at least one housing of the device 100. The clip connector 302 includes the abrasive surface 304 which is capable of abrading a first surface 402 of the optical fiber 208 when the optical fiber 208 is inserted into the clip connector 302. Abrasion occurs when the optical fiber 208 is inserted into the clip connector 302. The clip connector 302 also includes an aperture 404. The aperture 404 is capable of conveying light through the first surface 402 from/to the optical fiber 208 to/from an optical communication element, for example, from the first optical communication element 202 to the optical fiber 208 as illustrated in FIG. 3. Further, the clip connector 302 can enable the optical fiber 208 to be aligned with the aperture 404 and an optical communication element when the optical fiber 208 is inserted into the clip connector 302. As noted previously, in at least one embodiment of the present invention, a second surface that is opposite to the first surface 402 can be provided with a notch-cut. A surface of the clip connector 302 in contact with the notch-cut is provided with a reflective surface 406. When the escaping light through the notch-cut strikes the clip connector 302, the light is deflected by the reflective surface 406 into the optical fiber 208. The reflective surface could be deposited on the fiber side opposite to the entry/exit notch. This is done by creating a disturbance/ roughed surface on the fiber opposite to entry/exit point created through an abrasion, such as through the introduction of an intrusion of the type noted above, and depositing a reflective material at the point of the disturbance. In some embodiments, the reflective surface could be a portion of the clip connector itself, that is positioned opposite the entry/exit point for reflecting light between a direction that would allow the light to escape from the optical fiber and a direction that enables the light to travel along the length of the optical fiber 208.

When the clip connector is associated with an optical communication element that is functioning as a receiver, the portion of the clip connector 302 is intended to poke partially into the fiber body opposite of the abraded exit point through a notch-cut or a kink and intercept and redirect the optical signals traveling along the length of the fiber and reflect them back toward the exit point. When the clip connector is associated with an optical communication element that is functioning as a transmitter, the portion of the clip connector 302 is intended to poke partially into the fiber body opposite of the abraded entry point through a notch-cut or a kink and intercept and redirect the optical signals being received via the entry point and redirect it so that it travels along the length of the fiber.

Figure 5:
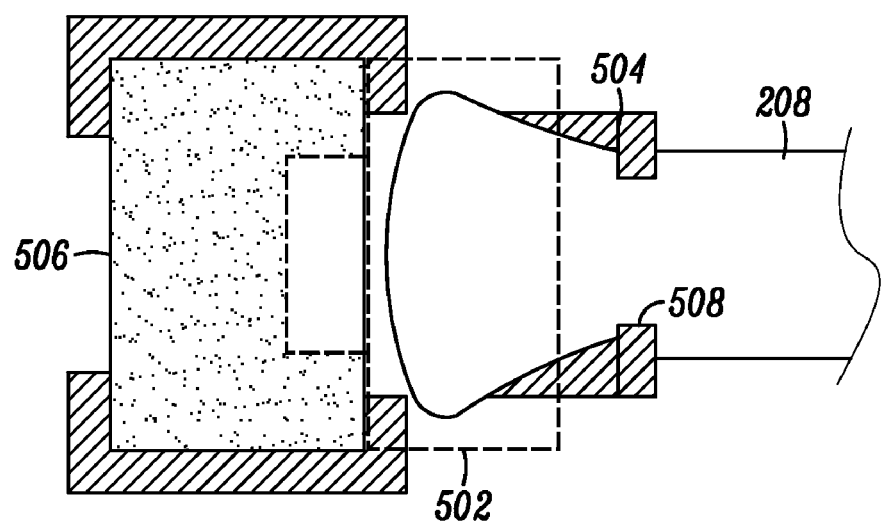
FIG. 5 illustrates a cross-sectional view of a clip connector for use in an optical communication coupling system for facilitating a conveyance of an optical communication signal between an optical fiber and an optical communication element at an end point of the optical fiber, in accordance with another embodiment of the present invention.

FIG. 5 illustrates a cross-sectional view of an optical communication coupling system 206, in accordance with another embodiment of the present invention. In the present embodiment, the optical fiber 208 is provided with an increased diameter 502 proximate one or both of the end points. The end point of the optical fiber 208 is bulged during manufacturing to provide the increased diameter 502. Examples of potential techniques which can be employed to produce the increased diameter includes, but is not limited to, a hot knife cutting technique, a polishing technique and a hot plate flattening technique. The increased diameter 502 enables the end point of the optical fiber 208 to be captivated by the clip connector 504 positioned proximate to an optical communication element, for example the optical communication element 506. The clip connector 504 includes a retention element 508 that at least partially grips the optical fiber 208 so as to resist removal of the optical fiber 208. The bulged end of the optical fiber 208 can also act as a lens by concentrating the light emitted by the optical communication element 506 inside the optical fiber 208. The lens focuses the light associated with an optical signal into the fiber core from an outside source or alternatively the lens focuses the light exiting from the fiber core onto an outside detector. This is especially useful if the source or detector is positioned any meaningful distance away from the fiber ends, which otherwise might allow some of the light to escape as it traverses the distance, thereby resulting in lost rays. The use of a lens will help to capture most of the rays, thereby resulting in better efficiency and less signal loss. The clip connector 504 helps to align the optical fiber 208 relative to the corresponding optical communication element 506, thereby enabling the conveyance of an optical signal between the optical communication element and the optical fiber, which in turn can be conveyed between the optical fiber and other optical communication elements located at the opposite end of the optical fiber or along the length of the same.

Various embodiments of the present invention, as described above, provide an optical communication coupling system, which supports the conveyance of an optical signal between multiple optical communication elements. The present invention involves the use of an optical fiber and clip connectors that provide a cost-effective and reliable connection between the optical fiber and an optical communication element through the insertion of an optical fiber into a clip connector positioned and aligned with the optical communication element.

In the foregoing specification, the invention, as well as its benefits and advantages, have been described with reference to specific embodiments. However, one with ordinary skill in the art would appreciate that various modifications and changes can be made, without departing from the scope of the present invention, as set forth in the following claims. Accordingly, the specification and figures are to be regarded in an illustrative rather than a restrictive sense. All such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of these claims, as issued.

What is claimed is:

1. An optical communication coupling system for use in a device, the optical communication coupling system comprising:

an optical fiber capable of conveying light between a first optical communication element and a second optical communication element; and a clip connector capable of receiving and retaining the optical fiber and, as part of receiving the optical fiber, altering the optical fiber to create an access point, the access point allows for a transfer of the light between the optical fiber and one of the first optical communication element and the second optical communication element, while the optical fiber is being retained by the clip connector;

wherein the clip connector comprises an abrasive surface capable of abrading a first surface of the optical fiber, and wherein the first surface is in contact with at least one of the first optical communication element and the second optical communication element; and wherein the clip connector includes an intruding surface, where a second surface of the optical fiber opposite to the first surface of the optical fiber is intruded through contact with the intruding surface of the clip connector in connection with the clip connector receiving the optical fiber, and wherein the second surface deflects the light inside the optical fiber.

2. An optical communication coupling system of claim 1 further comprising:

a notch-cut on the optical fiber, wherein the notch-cut is located opposite to the first surface; and a reflective surface, wherein the reflective surface is provided to the intruding surface of the clip connector in contact with the notch-cut, and wherein the reflective surface deflects the light escaping through the notch-cut inside the optical fiber.

3. An optical communication coupling system of claim 1, wherein the clip connector comprises an aperture capable of conveying the light through the first surface from the at least one of the first optical communication element to the optical fiber and from the optical fiber to the second optical communication element.

4. An optical communication coupling system of claim 1, wherein the optical fiber is provided with an increased diameter to at least one terminal of the optical fiber, and wherein the increased diameter enables the clip connector to couple the optical fiber to at least one of the first optical communication element and the second optical communication element.

5. An optical communication coupling system of claim 1, wherein at least one of the first optical communication element and the second optical communication element is selected from the group comprising a light emitting diode, a vertical-cavity surface emitting laser, an edge-emitting diode, a PIN diode and a photo-diode.

6. An optical communication coupling system of claim 1, wherein the optical fiber is selected from the group comprising an acrylic-fiber, a plastic optical fiber and a glass optical fiber.

7. An optical communication coupling system of claim 1, wherein the optical fiber comprises a covering of one of a cladding, paint and a reflective material.

8. An optical communication coupling system of claim 1, wherein the optical communication coupling system provides an optical coupling for supporting intra-device optical communication between one and more optical communication element.

9. A device comprising:

a first optical communication element;

a second optical communication element; and an optical communication coupling system comprising:

an optical fiber capable of conveying light between the first optical communication element and the second optical communication element; and a clip connector capable of receiving and retaining the optical fiber and, as part of receiving the optical fiber, altering the optical fiber to create an access point, which allows for a transfer of light between the optical fiber and one of the first optical communication element and the second optical communication element, while the optical fiber is being retained by the clip connector;

wherein the clip connector comprises an abrasive surface capable of abrading a first surface of the optical fiber, and wherein the first surface is in contact with at least one of the first optical communication element and the second optical communication element; and wherein the clip connector includes an intruding surface, where a second surface of the optical fiber opposite to the first surface of the optical fiber is intruded through contact with the intruding surface of the clip connector in connection with the clip connector receiving the optical fiber, and wherein the second surface deflects the light inside the optical fiber.

10. A device of claim 9, wherein the optical communication coupling system further comprises:

a notch-cut on the optical fiber, and wherein the notch-cut is located opposite to the first surface;

a reflective surface, wherein the reflective surface is provided to the intruding surface of the clip connector in contact with the notch-cut, and wherein the reflective surface deflects the light escaping through the notch-cut inside the optical fiber.

11. A device of claim 9, wherein the clip connector comprises an aperture capable of conveying the light through the first surface from at least one of the first optical communication element to the optical fiber and from the optical fiber to the second optical communication element.

12. A device of claim 9, wherein the optical fiber is provided with an increased diameter to at least one terminal of the optical fiber, and wherein the increased diameter enables the clip connector to couple the optical fiber to at least one of the first optical communication element and the second optical communication element.

13. A device of claim 9, wherein the optical communication coupling system provides an optical coupling for supporting intra-device optical communication between one and more optical communication element.

14. A device of claim 9, wherein the device is a wireless communication device.

15. A clip connector enabling optical communication between an optical fiber and an optical communication element, the clip connector comprising:

an abrasive surface capable of abrading a first surface of the optical fiber when the optical fiber is inserted into the clip connector;

an intruding surface capable of intruding a second surface of the optical fiber, the second surface of the optical fiber being opposite to the first surface of the optical fiber, through contact with the intruding surface of the clip connector in connection with the optical fiber being inserted into the clip connector, wherein when intruded the second surface deflects the light inside the optical fiber; and an aperture capable of conveying light through the first surface between the optical communication element and the optical fiber, wherein the resulting abrasion occurring as part of insertion is aligned with the aperture and at least one of a light emitting and a light receiving capability of the optical communication element, when the insertion of the optical fiber into the clip connector is completed and maintained.

16. A clip connector of claim 15 further comprising a retention element, wherein the retention element is capable of at least partially gripping the optical fiber, when the optical fiber is inserted into the clip connector so as to resist removal of the optical fiber.

* * * * *